US010434937B2

(12) United States Patent
Takagi

(10) Patent No.: US 10,434,937 B2
(45) Date of Patent: Oct. 8, 2019

(54) VEHICULAR LIGHTING DEVICE

(71) Applicant: Yazaki Corporation, Tokyo (JP)

(72) Inventor: Hiroyasu Takagi, Makinohara (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 0 days.

(21) Appl. No.: 15/967,650

(22) Filed: May 1, 2018

(65) Prior Publication Data

US 2019/0031096 A1    Jan. 31, 2019

(30) Foreign Application Priority Data

Jul. 31, 2017  (JP) ................................. 2017-147411

(51) Int. Cl.
| | | |
|---|---|---|
| *B60Q 1/00* | (2006.01) | |
| *B60Q 3/80* | (2017.01) | |
| *B60Q 3/233* | (2017.01) | |
| *B60Q 3/283* | (2017.01) | |
| *B62D 15/02* | (2006.01) | |
| *B62D 1/04* | (2006.01) | |
| *B60Q 3/76* | (2017.01) | |
| *B60Q 3/292* | (2017.01) | |

(52) U.S. Cl.
CPC ............... *B60Q 3/80* (2017.02); *B60Q 3/233* (2017.02); *B60Q 3/283* (2017.02); *B62D 1/046* (2013.01); *B62D 15/029* (2013.01); *B60Q 3/292* (2017.02); *B60Q 3/76* (2017.02)

(58) Field of Classification Search
CPC .......... B60Q 3/80; B60Q 3/233; B60Q 3/282; B60Q 3/76; B60Q 3/292; B62D 15/029

USPC ....................................................... 340/425.5
See application file for complete search history.

(56) References Cited

U.S. PATENT DOCUMENTS

| 6,179,453 | B1* | 1/2001 | McMahon | B60Q 3/82 |
| | | | | 362/488 |
| 7,121,699 | B2* | 10/2006 | Feldman | B60Q 3/57 |
| | | | | 362/488 |
| 2006/0044800 | A1* | 3/2006 | Reime | H05B 33/0803 |
| | | | | 362/276 |
| 2006/0261970 | A1* | 11/2006 | Colacecchi | B64D 11/00 |
| | | | | 340/686.1 |
| 2008/0172154 | A1* | 7/2008 | Tanaka | B60Q 11/00 |
| | | | | 701/36 |
| 2009/0207028 | A1* | 8/2009 | Kubey | A61B 3/113 |
| | | | | 340/575 |
| 2010/0295670 | A1* | 11/2010 | Sato | B60Q 9/00 |
| | | | | 340/458 |
| 2011/0006684 | A1* | 1/2011 | Hodgson | H05K 1/0284 |
| | | | | 315/77 |

(Continued)

FOREIGN PATENT DOCUMENTS

JP      2010-285061 A    12/2010

*Primary Examiner* — Naomi J Small
(74) *Attorney, Agent, or Firm* — Sughrue Mion, PLLC

(57) ABSTRACT

A lighting unit is mounted on a vehicle. A driving unit drives the lighting unit to move an illumination position. When a microcomputer detects getting-on, the microcomputer controls the driving unit, to move an illumination position of the lighting unit along a track running across an illumination area around feet outside the vehicle, an illumination area on a driver's seat, an illumination area on a starter switch, and an illumination area on a steering wheel.

6 Claims, 8 Drawing Sheets

(56) References Cited

U.S. PATENT DOCUMENTS

| | | | |
|---|---|---|---|
| 2012/0307509 A1* | 12/2012 | Wimbert | B60N 2/0232 |
| | | | 362/464 |
| 2015/0251688 A1* | 9/2015 | Mayer | B62D 15/00 |
| | | | 180/402 |
| 2017/0120847 A1* | 5/2017 | Yamane | B60Q 3/82 |
| 2017/0267169 A1* | 9/2017 | Fleurence | B60Q 3/74 |
| 2017/0355383 A1* | 12/2017 | Klos | G08G 1/0962 |
| 2018/0151088 A1* | 5/2018 | Tan | G09B 9/042 |
| 2019/0054852 A1* | 2/2019 | Wickramasinghe | B60Q 1/24 |

* cited by examiner

VEHICULAR LIGHTING DEVICE

CROSS REFERENCE TO RELATED APPLICATIONS

This application is on the basis of Japanese Patent Application No. 2017-147411, the contents of which are hereby incorporated by reference.

BACKGROUND

Technical Field

The present invention relates to a vehicular lighting device.

Related Art

Conventionally, a device described in Japanese Patent Application Publication No. 2010-285061 (hereinafter, "JP'061") has been proposed as the above-stated vehicular lighting device. A lighting device for an interior of a vehicle described in JP'061 switches from one light source to another among a plurality of light sources, to sequentially illuminate a plurality of operation members in a vehicle.

SUMMARY

However, the above-stated conventional lighting device for an interior of a vehicle is configured to switch from one light source to another among a plurality of light sources. Thus, the light sources are alternately put on and off, which causes flicker and annoys a driver, causing a drawback of not providing hospitality for a driver or affinity for a vehicle. Also, a plurality of light sources is required, causing another drawback related to cost.

The present invention has been devised in view of the above-described background, and it is an object of the present invention to provide a vehicular lighting device which can produce hospitality for a driver and affinity for a vehicle at a low cost.

According to one aspect, the present invention provides a vehicular lighting device including: a light source mounted on a vehicle; a driving unit configured to drive the light source, to move an illumination position; a first detection unit configured to detect a predetermined state of the vehicle or a user; and a controller configured to start putting on the light source and control the driving unit to move an illumination position of the light source along a predetermined track in accordance with the detection by the first detection unit.

The track may be set so as to sequentially run on a plurality of objects.

The vehicular lighting device may further include a second detection unit configured to detect predetermined motion of the user, wherein the controller may control the driving unit, to move the illumination position of the light source so that a next object is illuminated, in accordance with the detection by the second detection unit.

The first detection unit may detect getting-on or getting-off of the user.

The track may be set on a single object.

The single object may be a rear seat or an elevating lift, and the track may be set so as to sequentially run across a plurality of operation members provided in the rear seat or the elevating lift.

The first detection unit may detect a curve in front of the vehicle during driving, the single object may be a steering wheel, and the controller may move the illumination position of the light source along a track running in accordance with a steering angle and a steering direction for going around the detected curve.

The first detection unit may detect that the vehicle is changed from a stopping state to a starting state when a steering wheel is not in a neutral position, the single object may be the steering wheel, and the controller may move the illumination position of the light source along a track running in accordance with a steering angle and a steering direction for returning the steering wheel to the neutral position.

The first detection unit may detect a state in which the user asks a question, and when an answer to the question includes a direction, the controller may move the illumination position of the light source along a track running in a direction corresponding to the answer, from a predetermined position.

The first detection unit may detect a sleeping state or a careless state of the user, and the controller may control the driving unit so that the illumination position of the light source is located on a face of the user, in accordance with the detection by the first detection unit, and may move the illumination position of the light source along a predetermined track so that the illumination position of the light source is located out of the face of the user when awakening of the user is detected.

The vehicular lighting device may further include a third detection unit configured to detect sight of the user from an image of the user, wherein the controller may move the illumination position of the light source to a position within the sight of the user that is detected by the third detection unit, and moves the illumination position of the light source from the position along the predetermined track.

As described above, according to the present invention, by moving an illumination position of a light source along a predetermined track, it is possible to provide a vehicular lighting device which can produce hospitality for a driver and affinity for a vehicle at a low cost.

DETAILED DESCRIPTION

First Embodiment

Figure 1:
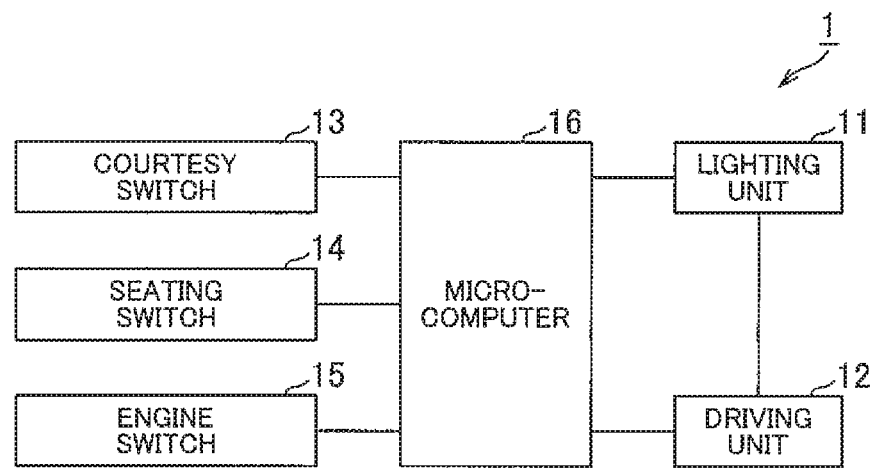
FIG. 1 is a block diagram showing a vehicular lighting device according to the present invention in a first embodiment.

Hereinafter, a first embodiment of the present invention will be described with reference to FIGS. 1 to 3. FIG. 1 is a block diagram showing a vehicular lighting device according to the present invention in the first embodiment. A vehicular lighting device 1 includes a lighting unit 11 serving as a light source, a driving unit 12, a courtesy switch 13 serving as a first detection unit, a seating switch 14 and an engine switch 15 which serve as second detection units, and a microcomputer 16.

Figure 2:
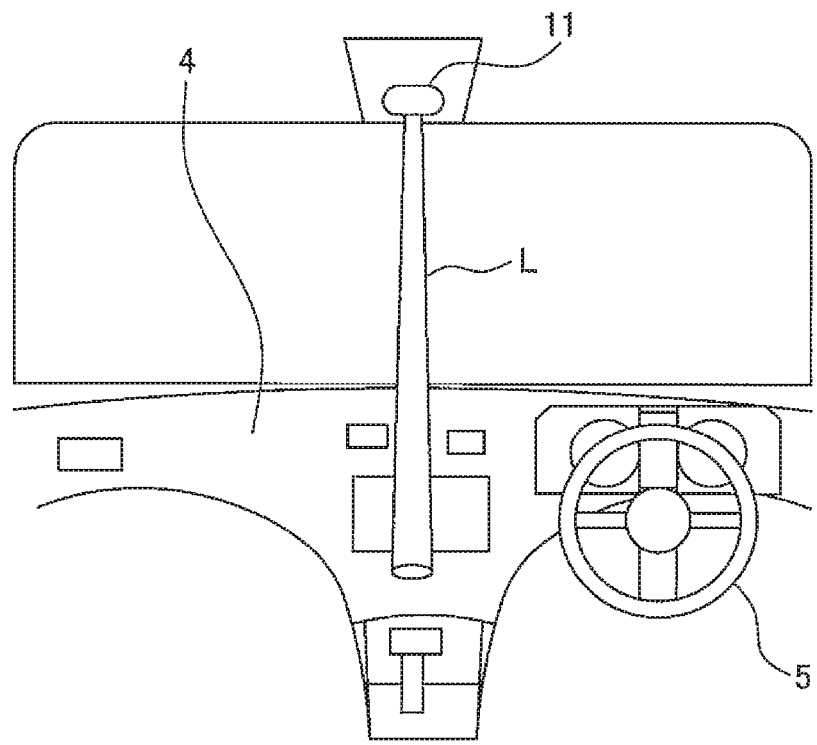
FIG. 2 is an explanatory view for explaining a position where a lighting unit in FIG. 1 is attached.
Figure 3:
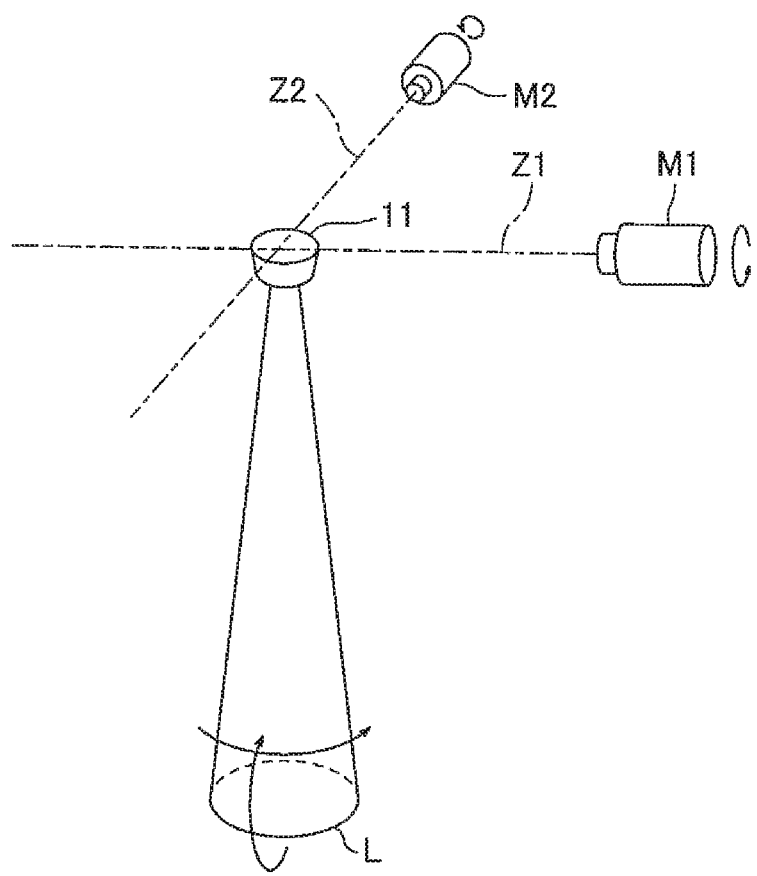
FIG. 3 shows details of the lighting unit and a driving unit shown in FIG. 1.

The lighting unit 11 includes a light source such as an LED, and emits spot light L which is projected in a shape of a circle as shown in FIGS. 2 and 3. The lighting unit 11 is rotatably supported at a ceiling of a vehicle, for example.

The driving unit 12 includes a first rotation motor M1 which rotates the lighting unit 11 about a first rotation axis Z1, and a second rotation motor M2 which rotates the lighting unit 11 about a second rotation axis Z2 crossing the first rotation axis Z1, as shown in FIG. 3. The first rotation axis Z1 and the second rotation axis Z2 cross an optical axis of the lighting unit 11. Accordingly, the driving unit 12 can move the lighting unit 11 through 360 degrees.

The courtesy switch 13 is a switch which is turned on and off in accordance with opening and closing of a door of a vehicle. The seating switch 14 is a switch which is turned on when a user is seated on a driver's seat which is one seat of a vehicle.

The engine switch 15 is a switch which is turned on when a user performs an on-operation of a starter switch.

The microcomputer 16 includes a CPU, a ROM, a RAM, and the like, and has control over a whole of the vehicular lighting device 1. The microcomputer 16 is connected with the courtesy switch 13, the seating switch 14, and the engine switch 15, and information about on/off of those switches is input to the microcomputer 16. Also, the microcomputer 16 is connected with the lighting unit 11 and the driving unit 12, and controls the lighting unit 11 and the driving unit 12.

When the microcomputer 16 detects getting-on of a user, the microcomputer 16 controls the lighting unit 11 and the driving unit 12, to move an illumination position of the lighting unit 11 along a predetermined track and sequentially illuminate a user's feet, a driver's seat, a starter switch, and a steering wheel (objects) in the stated order, for example. Thus, the microcomputer 16 guides a user to get on. Also, when the microcomputer 16 detects that a user is about to get off a vehicle, the microcomputer 16 controls the lighting unit 11 and the driving unit 12, to move an illumination position of the lighting unit 11 along a predetermined track and sequentially illuminate a seat of a user and a user's feet in the stated order, for example. Thus, the microcomputer 16 guides a user to get off.

Figure 4:
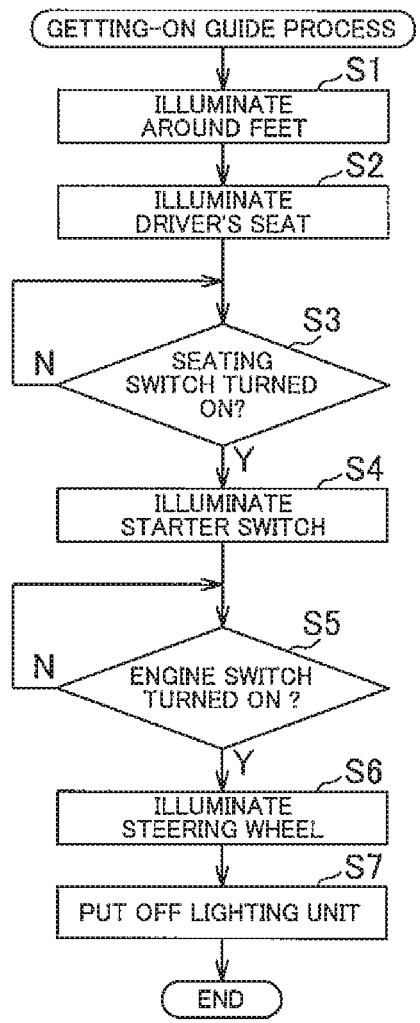
FIG. 4 is a flow chart showing a getting-on guide process of a microcomputer shown in FIG. 1.

Next, detailed operations of the vehicular lighting device 1 roughly described above will be described below with reference to FIGS. 4 to 6. First, when a user opens a door to get into a vehicle, the courtesy switch 13 is turned on. When the courtesy switch 13 is turned on while the seating switch 14 is being turned off and nobody is in the vehicle, the microcomputer 16 detects getting-on of a user, and carries out a getting-on guide process shown in FIG. 4.

Figure 5:
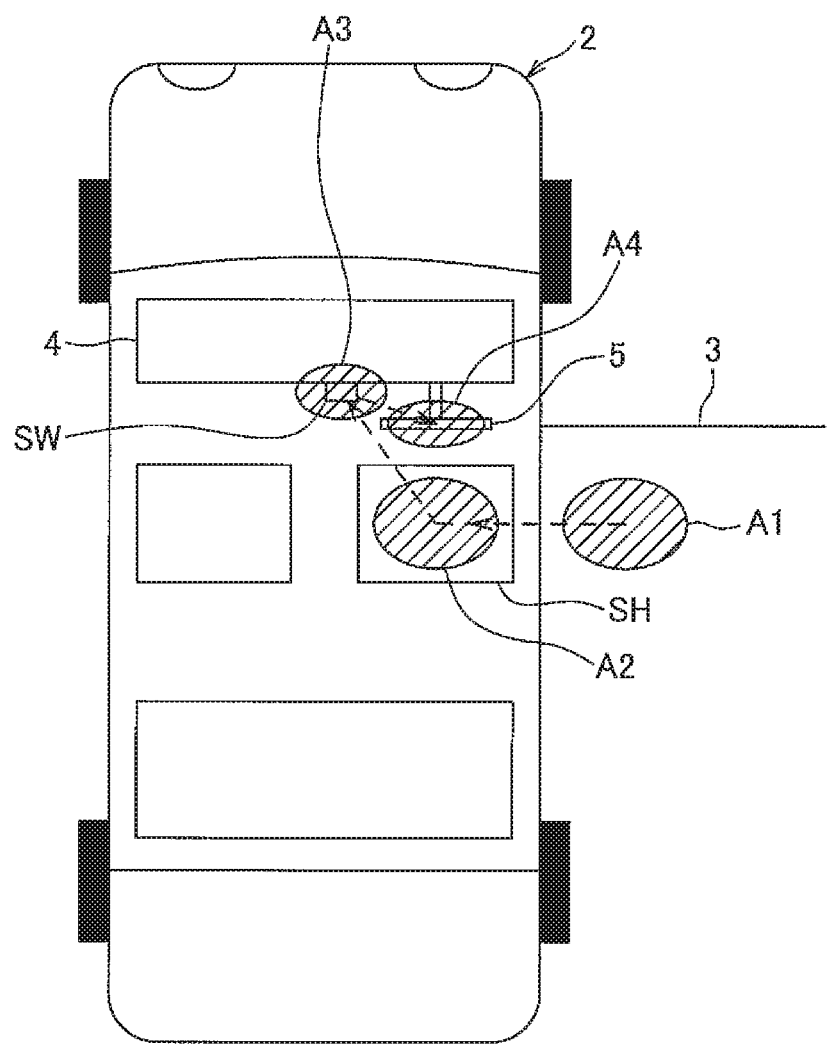
FIG. 5 is an explanatory view for explaining operations of the vehicular lighting device shown in FIG. 1 according to the first embodiment.
Figure 6:
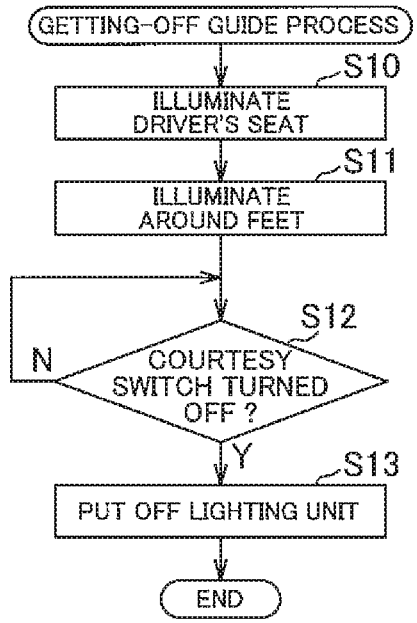
FIG. 6 is a flow chart showing a getting-off guide process of the microcomputer shown in FIG. 1.

The microcomputer 16 controls the lighting unit 11 and the driving unit 12, to illuminate an illumination area A1 around a user's feet outside a vehicle 2 via an opened door 3, as shown in FIG. 5 (step S1). More specifically, the microcomputer 16 controls the driving unit 12, to move the lighting unit 11 to a position where the lighting unit 11 can illuminate the illumination area A1 with the lighting unit 11 being put off. Subsequently, the microcomputer 16 puts on the lighting unit 11 to start illumination, and illuminates the illumination area A1 which is around a user's feet.

After the illumination area A1 is illuminated for a predetermined time, the microcomputer 16 controls the driving unit 12, to move an illumination position of the lighting unit 11 from the illumination area A1 to an illumination area A2 on a driver's seat SH, and illuminates the driver's seat SH (step S2). Subsequently, the microcomputer 16 determines whether or not seating of a user is detected depending on an on/off state of the seating switch 14 (step S3). When seating of a user is detected (Y in the step S3), the microcomputer 16 controls the driving unit 12, to move an illumination position of the lighting unit 11 from the illumination area A2 to an illumination area A3 on a starter switch SW, and illuminates the starter switch SW (step S4). The starter switch SW is a switch disposed on an instrument panel 4 of a vehicle, and an engine of the vehicle 2 is started in response to the starter switch SW being operated by a user.

Thereafter, the microcomputer 16 determines whether or not an on-operation of the starter switch SW by a user is detected depending on an on/off state of the engine switch 15 (step S5). When an on-operation of the starter switch SW is detected (Y in the step S5), the microcomputer 16 controls the driving unit 12, to move an illumination position of the lighting unit 11 from the illumination area A3 to an illumination area A4 on a steering wheel 5, and illuminates the steering wheel 5 (step S6). Then, after the steering wheel 5 is illuminated for a predetermined time, for example, the microcomputer 16 puts off the lighting unit 11 (step S7) and finishes a getting-on guide process. In the above-stated getting-on guide process, the microcomputer 16 keeps the lighting unit 11 being put on during movement from the illumination area A1 to the illumination area A5.

In the above-stated getting-on guide process, when the microcomputer 16 detects getting-on of a user, the microcomputer 16 controls the driving unit 12, to move an illumination position of the lighting unit 11 along a predetermined track which sequentially runs on objects including feet, the driver's seat SH, the starter switch SW, and the steering wheel 5. That is, light provided from the lighting unit 11 moves along the above-stated track with the lighting unit 11 being put on. Accordingly, the respective objects are illuminated in order, which eliminates a need to alternately put on and off a light source, thereby providing hospitality for a driver and affinity for a vehicle at a time of getting-on. Also, there is no need to provide the same number of light sources as objects, thereby reducing a cost.

Also, the microcomputer 16 controls the driving unit 12 in such a manner that a next object is illuminated when motion of a user such as seating of a user or an on-operation of the starter switch SW is detected. Accordingly, an illumination position can be moved in accordance with motion of a user, thereby further providing hospitality for a driver and affinity for a vehicle.

Next, when a user opens the door 3 to get off a vehicle, the courtesy switch 13 is turned on. The microcomputer 16 detects getting-off of a user when the courtesy switch 13 is turned on while the seating switch 14 is being turned on and a user is present in the vehicle 2, and then carries out a getting-off guide process shown in FIG. 6.

The microcomputer 16 controls the driving unit 12 and the lighting unit 11, to illuminate the illumination area A2 on the driver's seat SH as shown in FIG. 5 (step S10). More specifically, the microcomputer 16 controls the driving unit 12, to move the lighting unit 11 to a position where the lighting unit 11 can illuminate the illumination area A2 with the lighting unit 11 being put off. Subsequently, the microcomputer 16 puts on the lighting unit 11, and illuminates the illumination area A2 on the driver's seat SH.

Thereafter, the microcomputer 16 controls the driving unit 12, to move an illumination position of the lighting unit 11 from the illumination area A2 to the illumination area A1 around a user's feet outside the vehicle 2, and illuminates a user's feet (step S11). When the microcomputer 16 detects that the courtesy switch 13 is turned off and the door 3 is closed (Y in step S12), the microcomputer 16 puts off the lighting unit 11 and finishes a getting-off guide process.

In the above-stated getting-off guide process, when the microcomputer 16 detects getting-off of a user, the microcomputer 16 controls the driving unit 12, to move an illumination position of the lighting unit 11 along a predetermined track which sequentially runs on objects including the driver's seat SH and feet. Accordingly, as with the above-stated getting-on guide process, hospitality for a driver and affinity for a vehicle at a time of getting-off can be produced, and also a cost can be reduced.

It is noted that though the above-described first embodiment has dealt with one example regarding a track of an illumination position, which runs in accordance with getting-on or getting-off, the present invention is not limited to that. For example, a track may be set so as to be changed in accordance with motion of a user. More specifically, after feet and the driver's seat SH are sequentially illuminated in the same manner as in the above-described first embodiment, the microcomputer 16 illuminates the starter switch SW when the microcomputer 16 detects that a user wears a seatbelt. Alternatively, the microcomputer 16 may be designed so as to illuminate a seatbelt when a user performs an on-operation of the starter switch SW after feet and the driver's seat SH are sequentially illuminated.

That is, after a user is seated, if a user wears a seatbelt before performing an on-operation of the starter switch SW, an illumination position of the lighting unit 11 is moved along a track which sequentially runs across feet, the driver's seat SH, and the starter switch SW. On the other hand, after a user is seated, if a user performs an on-operation of the starter switch SW before wearing a seatbelt, an illumination position of the lighting unit 11 is moved along a track which sequentially runs across feet, the driver's seat SH, and a seatbelt.

Also, though the driving unit 12 is controlled in such a manner that a next object is illuminated when motion of a user such as seating of a user or an on-operation of the starter switch SW is detected according to the above-described first embodiment, the present invention is not limited to that. For example, the driving unit 12 may be controlled in such a manner that feet, the driver's seat SH, the starter switch SW, and the steering wheel 5 are sequentially illuminated at regular intervals without detection of a user's motion.

Also, though a light source of the lighting unit 11 includes only an LED and this LED is driven according to the above-described first embodiment, the present invention is not limited to that. For example, in a case where a light source of the lighting unit 11 includes a light-source portion such as an LED and a reflection portion (an MEMS mirror, for example) which can be driven to reflect light provided from the light-source portion, an illumination position of the lighting unit 11 may be moved by driving of the reflection portion.

Second Embodiment

Figure 7:
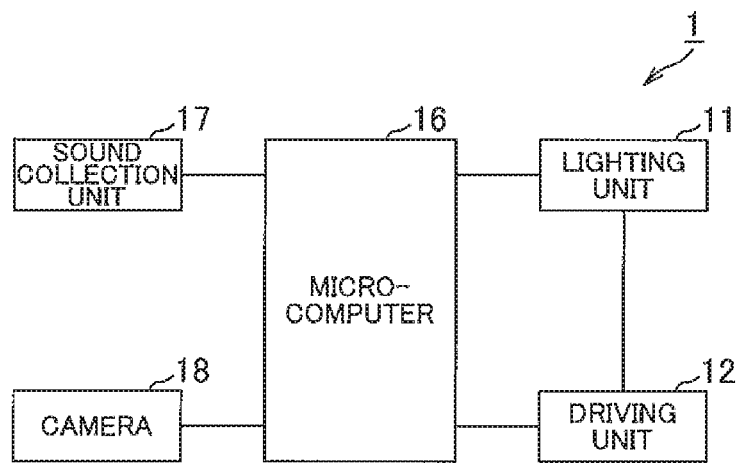
FIG. 7 is a block diagram showing a vehicular lighting device according the present invention in a second embodiment.
Figure 8:
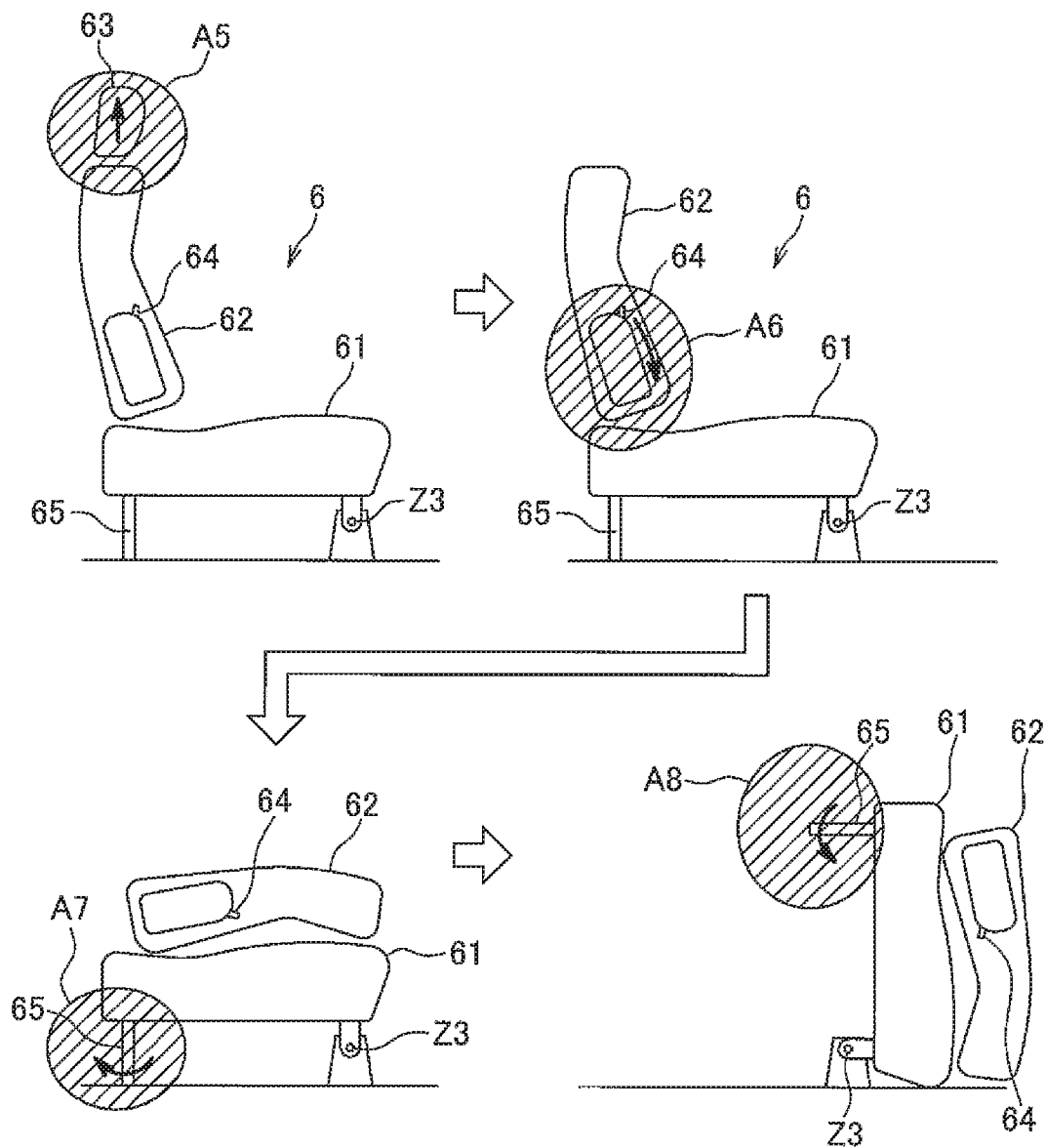
FIG. 8 is an explanatory view for explaining operations of the vehicular lighting device shown in FIG. 7 according to the second embodiment.

Next, a second embodiment of the present invention will be described with reference to FIGS. 7 and 8. FIG. 7 is a block diagram showing a vehicular lighting device 1 according to the present invention in the second embodiment. It is noted that in FIG. 7, parts which have already described in the-above described first embodiment with reference to FIG. 1 will be denoted by the same reference numerals, and detailed description thereof will be omitted.

The vehicular lighting device 1 includes a lighting unit 11 serving as a light source, a driving unit 12, a sound collection unit 17 serving as a first detection unit, a microcomputer 16, and a camera 18. The sound collection unit 17 includes a known microphone and collects speech from a user. The camera 18 is disposed in a vehicle and attached so as to pick up an image of an interior of a vehicle.

Whereas a track of an illumination position of the lighting unit 11 runs across a plurality of objects in the above-described first embodiment, the second embodiment will deal with an example in which a track runs on only one object. According to the second embodiment, a track is set so as to sequentially run across operation members provided in a rear seat which is a single object, in an order in which the operation members are operated at a time of folding a rear seat, for example. The microcomputer 16 analyzes speech information provided from a user, and the microcomputer 16 starts illuminating a rear seat when it detects that a user asks a question requesting instructions for folding a rear seat.

Operations of the vehicular lighting device 1 roughly described above according to the second embodiment will be described with reference to FIG. 8. A rear seat 6 includes a seat unit 61, a back rest 62, and a pillow 63. First, the microcomputer 16 controls the lighting unit 11 and the driving unit 12, to illuminate an illumination area A5 on the pillow 63. As a result of this, a user understands that he should detach the pillow 63 first.

After the illumination area A5 is illuminated for a predetermined time, the microcomputer 16 controls the driving unit 12, to move the lighting unit 11 to a position where the lighting unit 11 can illuminate an illumination area A6 on operation levers 64 provided on right and left sides of the back rest 62. As a result of this, a user understands that he should next operate the operation levers 64 to tilt the back rest 62.

After the illumination area A6 is illuminated for a predetermined time, the microcomputer 16 controls the driving unit 12, to move the lighting unit 11 to a position where the lighting unit 11 can illuminate an illumination area A7 on a rear leg 65 provided below the seat unit 61. As a result of this, a user understands that he should next raise the rear leg 65 and rotate the seat unit 61 about an axis Z3 so that the seat unit 61 stands erect.

After the illumination area A7 is illuminated for a predetermined time, the microcomputer 16 controls the driving unit 12, to move the lighting unit 11 to a position where the lighting unit 11 can illuminate an illumination area A8 on the rear leg 65 with the seat unit 61 standing erect. As a result of this, a user understands that he should next fold the rear leg 65.

Also, the microcomputer 16 detects an illumination position of the lighting unit 11 from an image picked up by the camera 18, and feedback-controls the driving unit 12 in such a manner that the lighting unit 11 sequentially goes across operation members (the pillow 63, the operation levers 64, and the rear leg 65) on the rear seat 6 properly, based on a result of the detection. Also, the microcomputer 16 recognizes a human face from an image picked up by the camera 18, and controls the driving unit 12 so that an illumination position does not go across a human face (particularly, eyes).

According to the above-described second embodiment, an object is the rear seat 6, and a track is set so as to sequentially run across operation members (the pillow 63, the operation levers 64, and the rear leg 65) on the rear seat 6. Thus, it is possible to give a user guidance on a way of folding the rear seat 6.

It is noted that though a question requesting instructions for folding the rear seat 6 is detected with the sound collection unit 17 in the above-described second embodiment, the present invention is not limited to that. Detection may be made through an operation of an operation member such as a switch.

Also, though the lighting unit 11 merely illuminates the illumination areas A5 to A8 uniformly in the above-described second embodiment, the present invention is not limited to that. For example, with the use of a projector which can project an image as the lighting unit 11, an arrow indicating a direction for operation to the rear seat 6 may be projected as shown in FIG. 8. Alternatively, a pointer may be projected in the rear seat 6, and moved in a direction for operation.

Also, though the microcomputer 16 feedback-controls the driving unit 12 in the above-described second embodiment, the present invention is not limited to that. The driving unit 12 may be feedforward-controlled in the same manner as in the first embodiment.

Also, though the lighting unit 11 gives guidance on a way of folding the rear seat 6 in the above-described second embodiment, the present invention is not limited to that. The lighting unit 11 may give guidance on an operation of an elevating lift for the physically disabled. A procedure for placing a wheelchair on a vehicle with the use of an elevating lift is as follows, for example. First, an elevating lift is lowered through an operation of a remote controller, and a wheelchair is placed on the elevating lift. Subsequently, the wheelchair is fixed using a stopper or a seatbelt provided in the elevating lift, and the elevating lift is raised through an operation of the remote controller, so that the wheelchair is placed on the vehicle. Then, the lighting unit 11 may be designed so as to sequentially illuminate the remote controller, the stopper, the seatbelt, and the like, to give guidance on an operation of the elevating lift.

Third Embodiment

Figure 9:
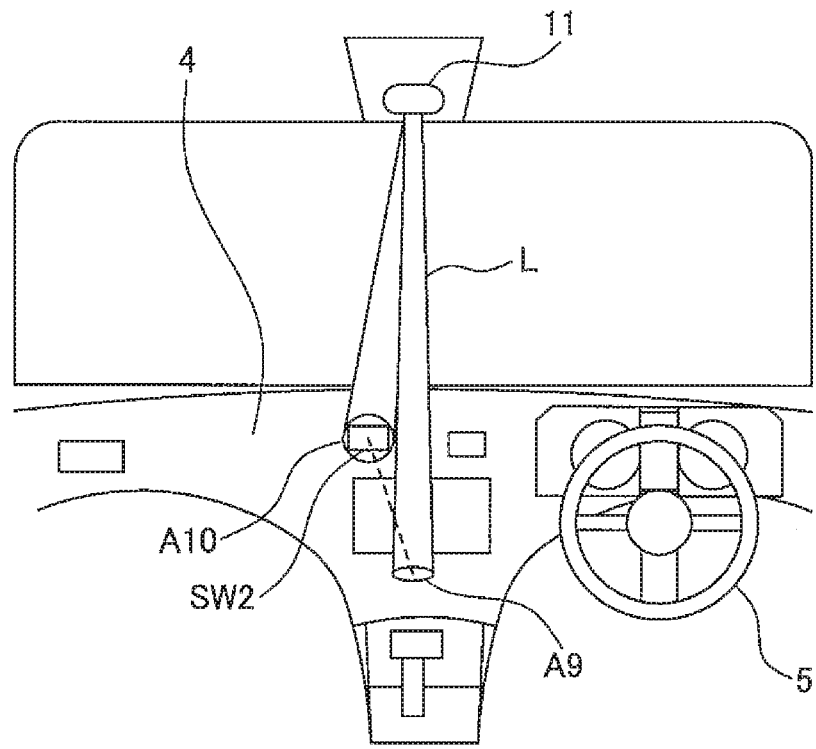
FIG. 9 is an explanatory view for explaining operations of the vehicular lighting device shown in FIG. 7 according to a third embodiment.

Next, a third embodiment of the present invention will be described with reference to FIG. 9. A configuration of a vehicular lighting device 1 according to the third embodiment is similar to that of the vehicular lighting device 1 according to the second embodiment shown in FIG. 7, and so, detailed description thereof will be omitted.

Operations of the above-stated vehicular lighting device 1 according to the third embodiment will be described. When a microcomputer 16 detects that a user asks a question about a direction or a place by analyzing speech information provided from a user, the microcomputer 16 starts illuminating an instrument panel 4, for example.

For instance, when a user asks a question about a place or a direction, such as a question, "where is a switch of an air conditioner?" or a question, "in what direction is an ambulance?", that speech information is input to the microcomputer 16 through a sound collection unit 17. Subsequently, the microcomputer 16 computes an answer to a question of a user. Then, the microcomputer 16 controls a lighting unit 11 and a driving unit 12, to illuminate a predetermined illumination area A9 (predetermined position) on the instrument panel 4. The illumination area A9 is an area within sight of a user who is seated on a driver's seat SH. It is noted that the illumination area A9 may be either previously determined, or determined after detecting an area within sight of a current user from an image of a user's face which is picked up by a camera or the like. In the latter case, the detected area within sight of a current user is the illumination area A9.

Thereafter, the microcomputer 16 controls the driving unit 12, to move an illumination position of the lighting unit 11 from the illumination area A9 along a track running in a direction corresponding to an answer to the above-stated question. For example, if a question is "where is a switch of an air conditioner?" and a switch SW2 of an air conditioner is placed on the upper left obliquely with respect to the illumination area A9, the microcomputer 16 obliquely moves an illumination position of the lighting unit 11 from the illumination area A9 to the upper left. At that time, if an object to be illuminated is placed in an area that can be illuminated by the lighting unit 11, like the switch SW2 of an air conditioner, the microcomputer 16 moves an illumination position of the lighting unit 11 to an illumination area A10 on the switch SW2.

On the other hand, in a case where a question is "in what direction is an ambulance?" and an ambulance is found on the right of a vehicle as a result of analysis of an image picked up by a camera not shown, the microcomputer 16 moves an illumination position of the lighting unit 11 rightward from the illumination area A9.

According to the above-described third embodiment, it is possible to give an answer to a user's question about a place or a direction answer, using light, so that a user can intuitively grasp an answer while driving without being disturbed.

Fourth Embodiment

Figure 10:
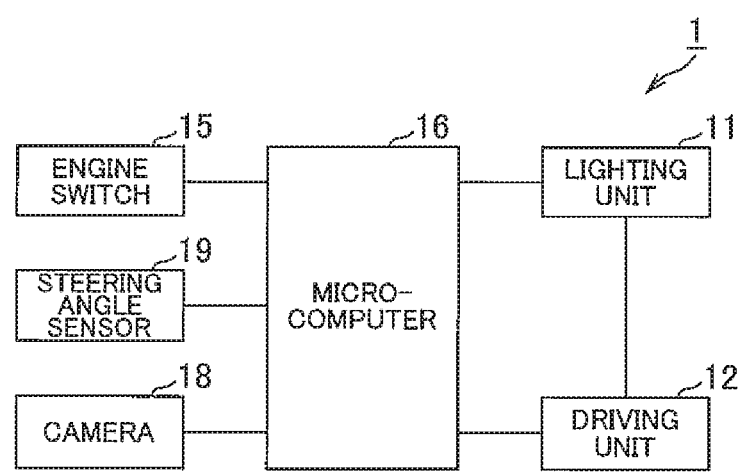
FIG. 10 is a block diagram showing a vehicular lighting device according to the present invention in a fourth embodiment.
Figure 11:
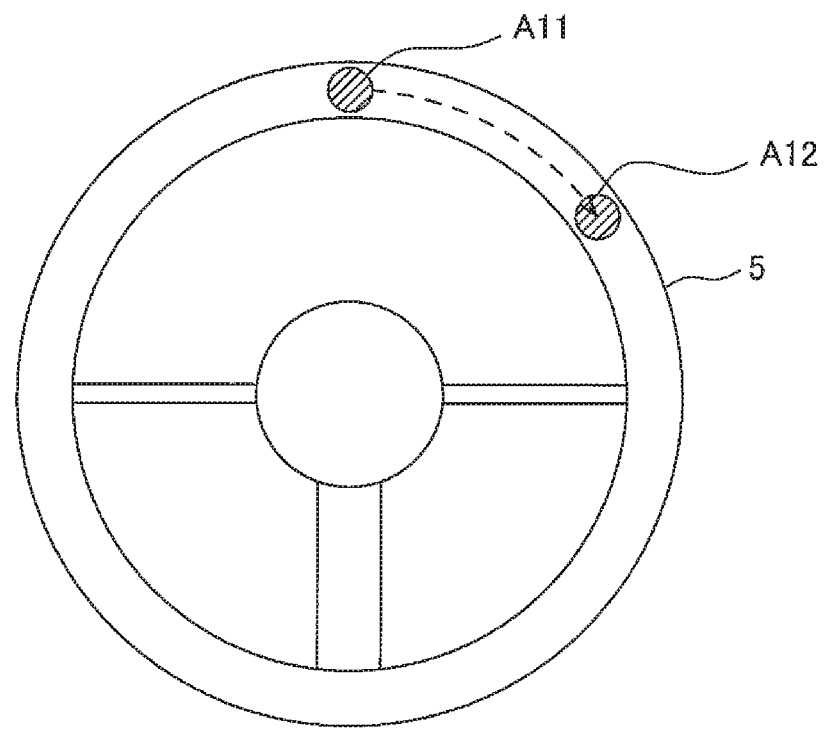
FIG. 11 is an explanatory view for explaining operations of the vehicular lighting device shown in FIG. 10.
Figure 12:
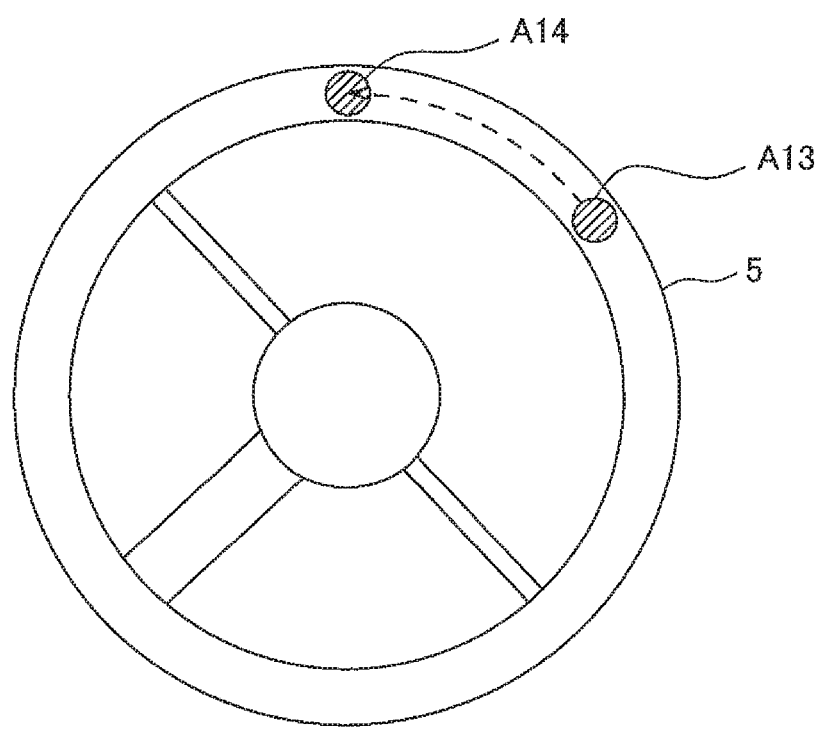
FIG. 12 is an explanatory view for explaining operations of the vehicular lighting device shown in FIG. 10.

Next, a fourth embodiment of the present invention will be described with reference to FIGS. 10 and 11. FIG. 10 is a block diagram showing a vehicular lighting device 1 according to the present invention in the fourth embodiment. It is noted that in FIG. 10, parts which have already been described in the above-described first embodiment with reference to FIG. 1 will be denoted by the same reference numerals and detailed description thereof will be omitted.

A microcomputer 16 of the fourth embodiment illuminates a steering wheel 5 to give guidance on operations of the steering wheel 5. The vehicular lighting device 1 includes a lighting unit 11, a driving unit 12, and a camera 18 and an engine switch 15 which serve as first detection units, and a steering angle sensor 19. The camera 18 is attached so as to pick up an image of an area in front of a vehicle, for example. The steering angle sensor 19 can detect a steering angle of a vehicle.

The microcomputer 16 analyzes an image of the camera 18 in the course of driving, to detect whether or not there is a curve in the front. When it is detected that there is a curve, the microcomputer 16 obtains a steering angle and a steering direction of the steering wheel 5 for going around the detected curve. Subsequently, the microcomputer 16 illuminates an illumination area A11 corresponding to the uppermost portion of the steering wheel 5.

Thereafter, the microcomputer 16 moves an illumination position of the lighting unit 11 toward an illumination area A12 which is determined in accordance with the obtained steering angle and the obtained steering direction of the steering wheel 5. A track from the illumination area A11 to the illumination area A12 takes a shape of a partial circle along the steering wheel 5. That is, the microcomputer 16 moves an illumination position of the lighting unit 11 along a track running in accordance with the steering angle and the steering direction for going around the detected curve. As a result of this, a user can intuitively grasp to what degree he should turn the steering wheel 5 while driving without being disturbed.

Also, when the engine switch 15 is turned on the microcomputer 16 detects that a vehicle is changed from a stopping state to a starting state. Subsequently, the microcomputer 16 reads a result of detection of the steering angle sensor 19, and detects whether or not a steering wheel is in a neutral position. Additionally, if the steering wheel 5 is not in a neutral position, the microcomputer 16 detects a steering-without-driving state, and then moves an illumination position of the lighting unit 11 along a track running in accordance with a steering angle and a steering direction for returning the steering wheel 5 to a neutral position.

More specifically, the microcomputer 16 obtains the uppermost portion of the steering wheel 5 in a steering-without-driving state based on a steering angle of the steering wheel 5, and moves an illumination position from an illumination area A13 on the obtained uppermost portion to an illumination area A14 on the uppermost portion of the steering wheel 5 in a neutral state. As a result of this, a user can intuitively grasp to what degree he should turn the steering wheel 5 in order to return the steering wheel 5 to a neutral position.

It is noted that though a single lighting unit 11 is moved in the above-described embodiment, the present invention is not limited to that. A plurality of lighting units 11 may be used so that a track is connected by relaying.

Also, according to a possible different embodiment, when the microcomputer 16 detects that a vehicle starts with a parking brake being pulled, the microcomputer 16 illuminates a parking brake which is disposed between a driver's seat and a passenger seat or near a bottom of a driver's seat, and moves an illumination position of the lighting unit 11 back and forth repeatedly on the parking brake.

Fifth Embodiment

Next, a fifth embodiment of the present invention will be described. A configuration of a vehicular lighting device 1 according to the fifth embodiment is similar to that of the vehicular lighting device 1 according to the second embodiment shown in FIG. 7, and so, detailed description thereof will be omitted.

Operations of the above-stated vehicular lighting device 1 according to the fifth embodiment will be described. When a microcomputer 16 detects a sleeping state or a careless state (concentrating on the other thing than driving) of a user from an image picked up by a camera 18, the microcomputer 16 controls a driving unit 12, to drive a lighting unit 11 so that an illumination position is located at a user's face. Subsequently, the lighting unit 11 is put on, to illuminate a user's face. At that time, the microcomputer 16 detects positions of a user's eyes from an image picked up by the camera 18, and prevents a user's eyes from being directly illuminated. As a result of this, a user can be awaked from a sleeping state or a careless state.

Subsequently, when the microcomputer 16 detects an awaked state (being awaked from a sleeping state or a careless state) of a user from an image picked up by the camera 18, the microcomputer 16 controls the driving unit 12, to move the lighting unit 11 along a predetermined track so that an illumination position is located out of a user's face. At that time, by moving an illumination position to a tip point of a user's line of vision, it is possible for a user to visually recognize spot light L of the lighting unit 11 and know that he has been in a sleeping state or a careless state.

Sixth Embodiment

Next, a sixth embodiment of the present invention will be described. A configuration of a vehicular lighting device 1 according to the sixth embodiment is similar to that of the vehicular lighting device 1 according to the second embodiment shown in FIG. 7, and so, detailed description thereof will be omitted.

Operations of the above-stated vehicular lighting device 1 according to the sixth embodiment will be described. According to the sixth embodiment, a microcomputer 16 informs that automatic driving is shifted to manual driving or manual driving is shifted to automatic driving using a lighting unit 11. More specifically, when the microcomputer 16 detects that automatic driving is to be shifted to manual driving, the microcomputer 16 obtains an area within a user's sight (a tip point of line of vision) from an image of a face which is picked up by a camera 18 serving as a third detection unit.

Subsequently, the microcomputer 16 controls a driving unit 12, to drive the lighting unit 11 so that an illumination position is located in the obtained area within a user's sight, and thereafter puts on the lighting unit 11 in orange, for example.

After that, when the microcomputer 16 detects that automatic driving is properly shifted to manual driving, from an image of a user which is picked up by the camera 18, the microcomputer 16 moves an illumination position of the lighting unit 11 to an outside of the area within a user's sight, and then puts off the lighting unit 11. Thus, in the course of automatic driving in which there is no idea of in what direction a driver heads, an area within a user's sight is illuminated at a time when automatic driving is shifted to manual driving, so that a driver is informed that he should grip a steering wheel soon. In this manner, driving can be supported.

Also, when the microcomputer 16 detects that manual driving is to be shifted to automatic driving, the microcomputer 16 obtains an area within a user's sight (a tip point of line of vision) from an image of a face which is picked up by the camera 18. Subsequently, the microcomputer 16 controls the driving unit 12, to drive the lighting unit 11 so that an illumination position is located in the obtained area within a user's sight, and thereafter puts on the lighting unit 11 in blue, for example. However, the microcomputer 16 controls the driving unit 12 so that an illumination position is located at a corner of a user's sight, not in an area in front of a user's eyes though the illumination position is anyway within a user's sight. If the lighting unit 11 is suddenly put on in front of eyes in the course of manual driving, driving would be disturbed, and thus, a corner or the like of a user's sight, not an area in front of eyes, is illuminated.

After that, when the microcomputer 16 detects that manual driving is properly shifted to automatic driving, from an image of a user which is picked up by the camera 18, the microcomputer 16 moves an illumination position of the lighting unit 11 to an outside of an area within a user's sight, and puts off the lighting unit 11.

It is noted that though the lighting unit 11 is put on at a time of a shift from automatic driving to manual driving or a shift from manual driving to automatic driving according to the above-described sixth embodiment, the present invention is not limited to that. The microcomputer 16 may represent a driving state with colors by putting on the lighting unit 11 in blue during automatic driving while putting on the lighting unit 11 in yellow during manual driving, for example. In this case, the microcomputer 16 obtains an area within a user's sight (a tip point of line of vision) from an image of a face which is picked up by the camera 18 at all times, and controls the driving unit 12 so that an illumination position is always located in an area within a user's sight even if a user's line of vision moves. As for the above-stated way of representing a driving state, it is not limited to colors. By a design which allows characters to be projected in an illumination area of the lighting unit 11, it is possible to represent a driving state using characters. It is also possible to represent a driving state with an illumination state of the lighting unit 11 by causing the lighting unit 11 to blink during automatic driving while causing the lighting unit 11 to constantly illuminate during manual driving, for example.

It is noted that the present invention is not limited to the above-described embodiments. That is, various modifications can be made to carry out the present invention without departing from the essence of the present invention.

REFERENCE SIGNS LIST 2 vehicle
5 steering wheel (object)
6 rear seat (object)
11 lighting unit (light source)
12 driving unit
13 courtesy switch (first detection unit)
14 seating switch (second detection unit)
15 engine switch (first detection unit, second detection unit)
16 microcomputer (controller)
17 sound collection unit (first detection unit)
18 camera (first detection unit, third detection unit)
19 steering angle sensor (first detection unit)
63 pillow (operation member)
64 operation lever (operation member)
65 rear leg (operation member)
SH driver's seat (object)
SW starter switch (object)

What is claimed is:

1. A vehicular lighting device comprising:
   a light source mounted on a vehicle;
   a driving unit configured to drive the light source to move an illumination position;
   a first detection unit configured to detect a plurality of predetermined states of the vehicle or a user; and
   a controller configured to start putting on the light source and control the driving unit to move an illumination position of the light source along a predetermined track in accordance with the detection by the first detection unit,
   wherein the controller is configured to control the driving unit in response to each of the detections of the plurality of predetermined states of the vehicle or the user to sequentially illuminate a plurality of locations inside and/or outside of the vehicle to guide the user to perform a series of operations,
   wherein the first detection unit is configured to detect the user getting into the vehicle or getting out of the vehicle, and
   wherein the controller controls the driving unit to move the illumination position of the light source along the predetermined track in accordance with the detections by the first detection unit, thereby guiding the user to get into or get out of the vehicle.

2. The vehicular lighting device according to claim 1, wherein the track is set so as to sequentially run on a plurality of objects.

3. The vehicular lighting device according to claim 2, further comprising
   a second detection unit configured to detect predetermined motion of the user,
   wherein the controller controls the driving unit, to move the illumination position of the light source so that a next object is illuminated, in accordance with the detection by the second detection unit.

4. The vehicular lighting device according to claim 1, wherein
   the first detection unit detects a sleeping state or a careless state of the user, and
   the controller controls the driving unit so that the illumination position of the light source is located on a face of the user, in accordance with detection by the first detection unit, and moves the illumination position of the light source along a predetermined track so that the illumination position of the light source is located out of the face of the user when awakening of the user is detected.

5. The vehicular lighting device according to claim 1, further comprising
   a third detection unit configured to detect sight of the user from an image of the user, wherein
   the controller moves the illumination position of the light source to a position within the sight of the user that is detected by the third detection unit, and moves the illumination position of the light source from the position along the predetermined track.

6. A vehicular lighting device comprising:
   a light source mounted on a vehicle;
   a driving unit configured to drive the light source to move an illumination position;
   a first detection unit configured to detect a plurality of predetermined states of the vehicle or a user; and
   a controller configured to start putting on the light source and control the driving unit to move an illumination position of the light source along a predetermined track in accordance with the detection by the first detection unit,
   wherein the controller is configured to control the driving unit in response to each of the detections of the plurality of predetermined states of the vehicle or the user to move the illumination position of the light source and sequentially illuminate a plurality of locations inside and/or outside of the vehicle along the predetermined track to guide the user to perform a series of operations.

* * * * *